(12) United States Patent
Wang et al.

(10) Patent No.: US 11,891,678 B2
(45) Date of Patent: Feb. 6, 2024

(54) METHOD FOR OPTIMIZING LIQUID INJECTION PROCESS OF IONIC RARE EARTH ORE

(71) Applicants: JIANGXI UNIVERSITY OF SCIENCE AND TECHNOLOGY, Jiangxi (CN); LONGYAN RARE-EARTH DEVELOPMENT CO., LTD., Fujian (CN)

(72) Inventors: Guanshi Wang, Jiangxi (CN); Ping Long, Jiangxi (CN); Wenli Liu, Jiangxi (CN); Ying Huang, Jiangxi (CN); Dingshun He, Jiangxi (CN); Lei Qin, Jiangxi (CN); Shili Hu, Jiangxi (CN); Chenliang Peng, Jiangxi (CN); Sihai Luo, Jiangxi (CN); Guoqiang Deng, Jiangxi (CN)

(73) Assignees: JIANGXI UNIVERSITY OF SCIENCE AND TECHNOLOGY, Jiangxi (CN); LONGYAN RARE-EARTH DEVELOPMENT CO., LTD., Fujian (CN)

( * ) Notice: Subject to any disclaimer, the term of this patent is extended or adjusted under 35 U.S.C. 154(b) by 538 days.

(21) Appl. No.: 17/198,282

(22) Filed: Mar. 11, 2021

(65) Prior Publication Data
US 2021/0371954 A1    Dec. 2, 2021

(30) Foreign Application Priority Data

May 29, 2020    (CN) .......................... 202010473717.3

(51) Int. Cl.
*G06F 30/20*    (2020.01)
*E21B 43/28*    (2006.01)
(Continued)

(52) U.S. Cl.
CPC ................. *C22B 59/00* (2013.01); *C22B 3/14* (2013.01); *E21B 43/28* (2013.01); *G06F 30/20* (2020.01);
(Continued)

(58) Field of Classification Search
CPC . C22B 59/00; C22B 3/14; E21B 43/28; G06F 30/20; G06F 30/28; G06F 2111/10; G06F 2119/18; Y02P 10/20; Y02P 90/02
(Continued)

(56) References Cited

U.S. PATENT DOCUMENTS

2019/0147049 A1* 5/2019 Zu .......................... G10L 15/26
704/235

FOREIGN PATENT DOCUMENTS

WO    WO-2010099001 A1 *  9/2010   ......... G06F 17/5018

OTHER PUBLICATIONS

Lekakis, E. H., and V. Z. Antonopoulos. "Modeling the effects of different irrigation water salinity on soil water movement, uptake and multicomponent solute transport." Journal of Hydrology 530 (2015). pp. 431-446. (Year: 2015).*

(Continued)

*Primary Examiner* — John E Johansen
(74) *Attorney, Agent, or Firm* — JCIP GLOBAL INC.

(57) ABSTRACT

The present disclosure provides a method for optimizing a liquid injection process of ionic rare earth ore, including the following steps of: 1) testing the hydraulic properties of an ore body; 2) determining the diffusion degree of the ore body; 3) determining the spatial distribution of the rare earth grade and the impurity grade of the ore body prior to leaching; 4) determining model parameters of competitive exchange of rare earth ions and impurity ions with ammonium ions; 5) obtaining distribution of rare earth ion concentration within the ore body after completion of leaching;

(Continued)

6) obtaining a profile plot of a rare earth leaching rate as a function of the concentration and dosage of an injected leaching agent; and 7) determining a minimum leaching agent dosage to achieve a target leaching rate according to the profile plot, and then determining the ammonium sulfate concentration according to the minimum leaching agent dosage.

8 Claims, 2 Drawing Sheets

(51) Int. Cl.
*C22B 59/00* (2006.01)
*C22B 3/14* (2006.01)
*G06F 30/28* (2020.01)
*G06F 111/10* (2020.01)
*G06F 119/18* (2020.01)

(52) U.S. Cl.
CPC .......... *G06F 30/28* (2020.01); *G06F 2111/10* (2020.01); *G06F 2119/18* (2020.01); *Y02P 10/20* (2015.11); *Y02P 90/02* (2015.11)

(58) Field of Classification Search
USPC .............................................................. 703/9
See application file for complete search history.

(56) References Cited

OTHER PUBLICATIONS

Zhou, Fang, et al. "Role of initial moisture content on the leaching process of weathered crust elution-deposited rare earth ores." Separation and purification technology 217 (2019). pp. 24-30. (Year: 2019).*

* cited by examiner

METHOD FOR OPTIMIZING LIQUID INJECTION PROCESS OF IONIC RARE EARTH ORE

CROSS-REFERENCE TO RELATED APPLICATION

This application claims the priority benefit of China application serial no. 202010473717.3, filed on May 29, 2020. The entirety of the above-mentioned patent application is hereby incorporated by reference herein and made a part of this specification.

BACKGROUND

Technical Field

The present disclosure relates to the technical field of ionic rare earth ore mining, and in particular to a method for optimizing a liquid injection process of ionic rare earth ore.

Description of Related Art

Rare earths, especially medium weight rare earths, are important elements of high-end technology products and important reserve resources in countries, and southern ionic rare earth ores are of widespread interest due to their enrichment in medium weight rare earth resources. Ionic rare earth ores have the characteristics that rare earth ions are adsorbed on the surfaces of mineral earth particles in the nature of hydrated ions and hydroxyl hydrated ions, cations in an electrolyte solution can be used for reversible ion exchange reaction with adsorbed rare earth ions, and rare earth ions are desorbed, an in situ leaching process established according to this theory is a main mining process of ionic rare earth ores at the present stage, the concentration of a leaching agent in the in situ leaching process affects the rare earth ion mining cycle and the dosage of the leaching agent affects the final leaching rate of the rare earth ion mining, and therefore, how to determine the concentration and dosage of the leaching agent is of great importance for mining the ionic rare earth ores by using the in situ leaching process.

At the present stage, the design and construction staff mainly determine the concentration and dosage of the leaching agent in the leaching process based on the rare earth grade distribution of the ore body in combination with their own engineering experience, however, the rare earth grade is only one factor affecting the concentration and dosage of the leaching agent, and the permeability of the ore body and the amount of impurity ions adsorbed on the mineral earth particles are also important factors influencing the concentration and dosage of the leaching agent. The permeability of the ore body has significant spatial variability, even adjacent ore bodies also have a clear difference in permeability, it is difficult to obtain a more suitable concentration and dosage of the leaching agent by directly relying on engineering experience and rare earth grade information, in the early mining process, the dosage of the leaching agent estimated by engineering experience is seriously too small, resulting in repeated re-irrigation, and causing environmental pollution for many times, and if the estimated dosage of the leaching agent is too much, the mining cost is also increased and the environmental pollution in the mining process is further aggravated.

SUMMARY

The present disclosure provides a method for optimizing a liquid injection process of ionic rare earth ore to solve the above technical problems. According to the method, a theoretically based method of determining the concentration and dosage of a leaching agent is established based on testing the hydraulic properties and diffusion degree in situ while taking into account the consumption of the leaching agent by rare earth ions and impurity ions, combined with water flow movement and solute transport theory, thereby getting rid of existing limitation of reliance on engineering experience to determine the concentration and dosage of the leaching agent.

The technical solution of the present disclosure is specifically as follows:

A method for optimizing a liquid injection process of ionic rare earth ore, including the following steps of:

1) testing the hydraulic properties of an ore body: arranging a plurality of moisture sensors within the ore body, performing an in situ water injection test, analyzing moisture content data by using a hydraulic property inverse analysis method, and determining the hydraulic properties of the ore body;
2) determining the diffusion degree of the ore body;
3) forming prospecting holes in the ore body and sampling to determine the spatial distribution of the rare earth grade and the impurity grade of the ore body prior to leaching;
4) establishing a mathematical model for competitive exchange of rare earth ions and impurity ions with ammonium ions, sampling in situ, performing a leaching-in-tube test, and determining model parameters of the competitive exchange of the rare earth ions and impurity ions with ammonium ions;
5) substituting the hydraulic properties obtained in the step 1) into a mathematical equation of an existing percolation process within the ore body, determining moisture content distribution within the ore body, substituting the obtained moisture content distribution and the diffusion degree of the ore body obtained in the step 2) into a convection-diffusion equation to obtain distribution of ions within the ore body at any time under the action of convection and diffusion, and modifying the distribution of the ions within the ore body at any time by taking into account the grade distribution of the step 3) and the competitive exchange model of the step 4) to obtain distribution of rare earth ion concentration within the ore body after completion of leaching;
6) determining a rare earth leaching rate of the ore body according to the ion concentration distribution within the ore body before and after leaching, and varying the concentration and dosage of an injected leaching agent to obtain a profile plot of the rare earth leaching rate as a function of the concentration and dosage of the injected leaching agent; and
7) setting a target leaching rate, determining a minimum leaching agent dosage to achieve the target leaching rate according to the profile plot obtained in the step 6), and determining the ammonium sulfate concentration according to the minimum leaching agent dosage for the purpose of optimizing the liquid injection process.

Preferably, specific steps for determining the dispersion degree of the ore body in the step 2) include: establishing a fractal model of a soil-water characteristic curve and a fractal model of a non-reactive ion penetration curve by fractal theory, fitting the soil-water characteristic curve obtained in the step 1) by adopting the fractal model of the soil-water characteristic curve to obtain fractal parameters in the fractal model, substituting the fractal parameters into the fractal model of the penetration curve to obtain the penetration curve, and fitting the penetration curve by adopting an analytical solution to a convection-diffusion model of non-reactive ions to determine the diffusion degree of the ore body.

Preferably, the hydraulic properties of the ore body include the soil-water characteristic curve and an unsaturated permeability coefficient.

Preferably, during the prospecting process in the step 3), it is necessary to test simultaneously the amount of rare earth ions and impurity ions adsorbed on a mineral earth sample, the impurity ions include all non-rare earth cations adsorbed on the surfaces of mineral earth particles, and the average valence state of the impurity ions is determined by using a weighted average method.

Preferably, the process of exchange of the ammonium ions and rare earth ions and the process of exchange of the ammonium ions and impurity ions in the step 4) are described by using a two-parameter model, and the competitive exchange characteristics of the rare earth ions and impurity ions are taken into account by conservation of adsorption sites on the surfaces of the mineral earth particles in the exchange processes.

Preferably, in the step 1), a liquid injection hole having an ore discovery depth of 0.50-1.00 m and a diameter of 0.10-0.20 m is dug first, then at least 3 sensor burying holes penetrating through an ore bed are dug in a same plane with the central axis of the liquid injection hole, and at least 3 moisture sensors are buried in each sensor burying hole.

Preferably, the vertical spacing of adjacent moisture sensors is 0.50-1.50 m.

Preferably, a van Genuchten-Mualem model is used to describe the hydraulic properties of the ore body in the step 1).

The beneficial effects of the present disclosure are: according to the method, a numerical simulation method of an ionic rare earth ore leaching process is established based on testing the hydraulic properties and diffusion degree in situ while taking into account the consumption of the leaching agent by rare earth ions and impurity ions, combined with water flow movement and solute transport theory, the proposed method takes into account the effect of the hydraulic properties, diffusion degree, and spatial distribution of the rare earth grade and the impurity grade on the leaching of rare earth ions, and according to the proposed numerical simulation method of the leaching process, a theoretically based method of determining the concentration and dosage of the leaching agent is established, thereby getting rid of existing limitation of reliance on engineering experience to determine the concentration and dosage of the leaching agent.

DESCRIPTION OF THE EMBODIMENTS

The present disclosure is described in further detail below with reference to the accompanying drawings and specific embodiments.

A first step, the hydraulic properties of an ore body are tested.

Figure 1:
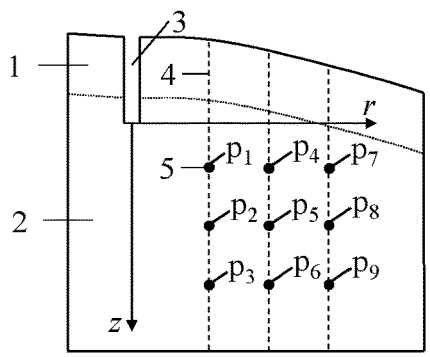
FIG. 1 is a schematic diagram of arrangement of moisture sensors.
Figure 2:
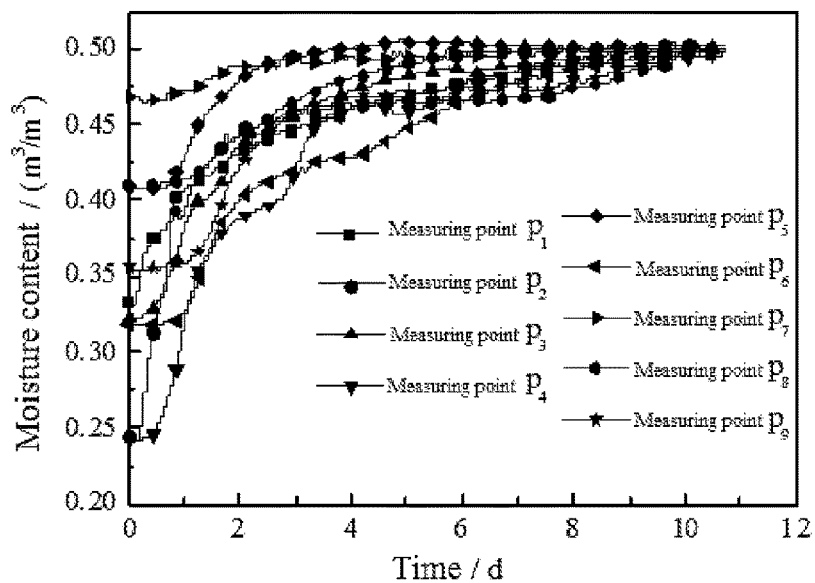
FIG. 2 shows test values of the moisture content.
Figure 3:
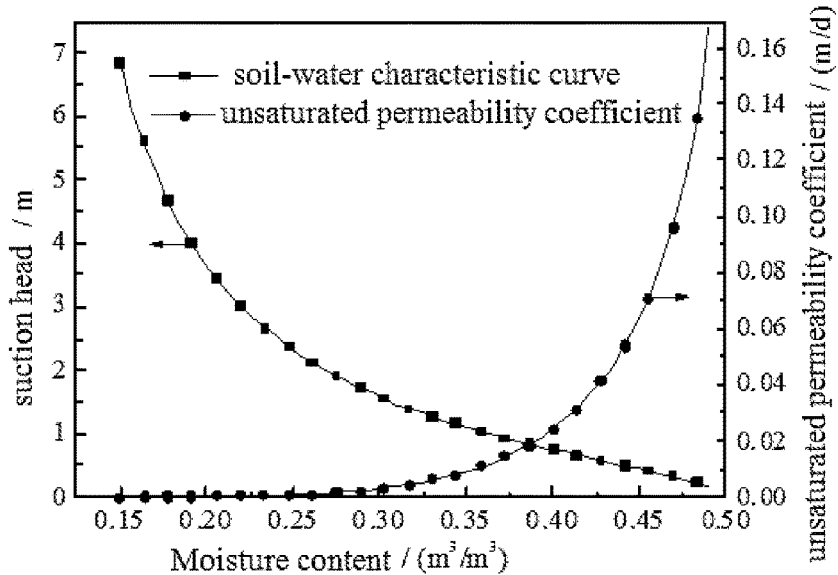
FIG. 3 is a test result of hydraulic properties.

An ore body having a cross-sectional area of 953.20 m² and an ore bed thickness of 7.54 m is selected from a certain ionic rare earth mining area in Changting, Fujian province, a location is selected to dig a liquid injection hole having an ore discovery depth of 0.50 m and a diameter of 0.15 m, undisturbed soil is sampled by using a soil sampling drill in the digging process, the initial mass moisture content measured by a drying method is 16.87%, and the dry density is 1.35 g/cm³; 3 sensor burying holes penetrating through an ore bed are dug in a same plane with the central axis of the liquid injection hole, the horizontal spacing of adjacent burying holes is 1.00 m, 3 moisture sensors are buried in each sensor burying hole, the vertical spacing of adjacent moisture sensors is 1.00 m, the schematic diagram of arrangement of the moisture sensors is shown in FIG. 1, wherein a topsoil layer 1, an ore bed 2, a liquid injection hole 3, sensor burying holes 4, and moisture sensors 5 are illustrated, the locations where the moisture sensors 5 are located are also referred to as measuring points, deionized water is injected into the liquid injection hole 3, the change of the moisture content at each location is recorded by the moisture sensors 5, i.e. to obtain test values of the moisture content at the measuring points, the results are shown in FIG. 2, the hydraulic properties of the ore body are described by using the van Genuchten-Mualem model, the soil-water characteristic curve and the unsaturated permeability coefficient in the hydraulic properties are a relational expression (1) and a relational expression (2), respectively, the percolation process of moisture within the ore body is described by an Richards equation (a relational expression (3)), by taking peripheral measuring points as boundary conditions of an intermediate measuring point, a difference method is used to solve the relational expression (3) to obtain a calculated value of the moisture content at the intermediate measuring point $p_5$ as a function of time, by taking a relational expression (4) as an objective function, and taking hydraulic parameters ($\theta_r$, n, $\alpha$ and $K_s$) as basic unknowns, an interior point algorithm is used to obtain the hydraulic parameters corresponding to the minimized objective function, the result is (0.0665 m³/m³, 1.778, 1.198 m⁴, 0.3203 m/d), the hydraulic properties of the ore body can be obtained through a test by substituting the calculation result of the hydraulic parameters into the relational expression (1) and the relational expression (2), respectively, the results are as shown in FIG. 3, and this method of determining the hydraulic properties of the ore body is referred to as a hydraulic property inverse analysis method.

$$\theta = \theta_r + (\theta_s - \theta_r)\left[\frac{1}{1+|\alpha h|^n}\right]^m, \quad (1)$$

$$K = K_s\left(\frac{\theta-\theta_r}{\theta_s-\theta_r}\right)^{1/2}\left[1 - \frac{\theta-\theta_r}{\theta_s-\theta_r}\left(\left(\frac{\theta-\theta_r}{\theta_s-\theta_r}\right)^{-\frac{1}{m}}-1\right)^{\frac{n-1}{n}}\right]^2, \quad (2)$$

$$\frac{\partial \theta}{\partial t} = \frac{1}{r}\frac{\partial}{\partial r}\left(rD\frac{\partial \theta}{\partial r}\right) + \frac{\partial}{\partial z}\left(D\frac{\partial \theta}{\partial z}\right) - \frac{\partial K}{\partial z}, \quad (3)$$

$$OF = \|\tilde{\theta} - \theta_b\|_2. \quad (4)$$

In the relational expressions (1)-(4), $\theta$ is volumetric moisture content, abbreviated as moisture content, $\theta_r$ and $\theta_s$ are residual moisture content and saturated moisture content, respectively, $\alpha$, n and m are parameters related to pore distribution, m=1−1/n, h is a suction head, $K_s$ and K are a saturated permeability coefficient and a non-saturated permeability coefficient, respectively, D is a diffusion coefficient, $D=-Kd\theta/dh$, t is time, z is a vertical coordinate, r is a radial coordinate, OF is an objective function, b is hydraulic parameters, $b=b(\theta_r, n, \alpha, K_s)$, $\|\ \|_2$ is a 2-norm operation, $\hat{\theta}$ is a test value of the moisture content at the intermediate measuring point, and $\theta_b$ is the calculated value of the moisture content at the corresponding intermediate measuring point $p_5$ when the hydraulic parameters adopt b.

A second step, the diffusion degree of the ore body is tested.

The soil-water characteristic curve tested in the first step is fitted by using a fractal model of the soil-water characteristic curve shown in a relational expression (5) with $h_{max}$ and $D_f$ as the basic unknowns to obtain $h_{max}$ and $D_f$, 0.4837 m and 2.510, respectively; the $h_{max}$ and $D_f$ are substituted into a relational expression (6) to obtain a penetration curve of non-reactive ions under fractal theory and the penetration curve is fitted by using a relational expression (7) with the diffusion degree $a_L$ and true pore flow rate $u_L$ as basic unknowns to obtain $\alpha_L$ and $u_L$, $4.61\times10^{-2}$ m/d and 0.2314 m/d, respectively.

$$\frac{\theta}{\theta_s} = \left(\frac{h_{max}}{h}\right)^{3-D_f}, \quad (5)$$

$$C_f = \frac{\int_{r_{min}}^{r_{max}} 2Q_r r_L^{-D_f} dr_L}{\int_{r_{min}}^{r_{max}} \pi J r_L^{4-D_f} dr_L}, \quad (6)$$

$$C_{CDE} = \frac{1}{2}\text{erfc}\left(\frac{L_z - u_L t}{2\sqrt{D_L t}}\right). \quad (7)$$

In the relational expressions (5)-(7), $h_{max}$ is a suction head corresponding to the maximum pore size, $D_f$ is a fractal dimension, $C_f$ is the outflow concentration of non-reactive ions of the fractal model, $r_{min}$ and $r_{max}$ are taken to be $0.53\times10^{-6}$ m and $1.23\times10^{-6}$ m, respectively, $r_L$ is a pore radius within the ore body, $J=2.43\times10^6$, $L_z$ is a thickness of an ore bed, $Q_r=0$ when $t<2L_z/Jr_L^2$, $Q_r=J\pi r_L^4/2$ when $t\geq 2L_z/Jr_L^2$, $C_{CDE}$ is the outflow concentration of the convection-diffusion equation, $u_L$ is a true pore flow rate, $D_L$ is a hydrodynamic diffusion coefficient, $D_L=\alpha_L u_L$, and $\alpha_L$ is the diffusion degree.

A third step, the spatial distribution of the rare earth grade and the impurity grade of the ore body prior to leaching is determined.

Prospecting holes with a diameter of 0.12 m penetrating through the ore bed are formed in the ore body every other 15.00 m, samples are taken once every other 1.50 m, continuous leaching is performed with 20 g/L of ammonium sulfate, the concentrations of rare earth and all impurity ions in the leachate are tested by using an ICP-MS instrument, the average valence state of the impurity ions is determined by a weighted average method of dividing the product of the valence state and concentration of various impurity ions by the total concentration, the result is +2.31, the mass of the oxides corresponding to the rare earth and impurities in the leachate is divided by the mass of the mineral earth to obtain the grades of the rare earth and impurities in the mineral earth, the spatial distribution of the grades of the rare earth and impurities at each coordinate (x, y, z, ERE, EIM) (x, y and z are coordinates, and $\varepsilon_{RE}$ and $\varepsilon_{IM}$ are the grades of the rare earth and impurities, respectively) is (7.5, 7.5, 1.5, 0.26‰, 0.40‰), (7.5, 7.5, 3.0, 0.65‰, 0.12‰), (7.5, 7.5, 4.5, 0.80‰, 0.13‰), (7.5, 7.5, 6.0, 0.51‰, 0.32‰), (7.5, 22.5, 1.5, 0.25‰, 0.36‰), (7.5, 22.5, 3.0, 0.55‰, 0.23‰), (7.5, 22.5, 4.5, 0.85‰, 0.10‰), (7.5, 22.5, 6.0, 0.43‰, 0.30‰), (22.5, 7.5, 1.5, 0.22‰, 0.41‰), (22.5, 7.5, 3.0, 0.70‰, 0.26‰), (22.5, 7.5, 4.5, 0.65‰, 0.29‰), (22.5, 7.5, 6.0, 0.47‰, 0.33‰), (22.5, 22.5, 1.5, 0.24‰, 0.43‰), (22.5, 22.5, 3.0, 0.47‰, 0.32‰), (22.5, 22.5, 4.5, 0.85‰, 0.09‰), and (22.5, 22.5, 6.0, 0.28‰, 0.51‰), respectively.

A fourth step, model parameters of exchange of rare earth ions and impurity ions with ammonium ions are determined.

Figure 4:
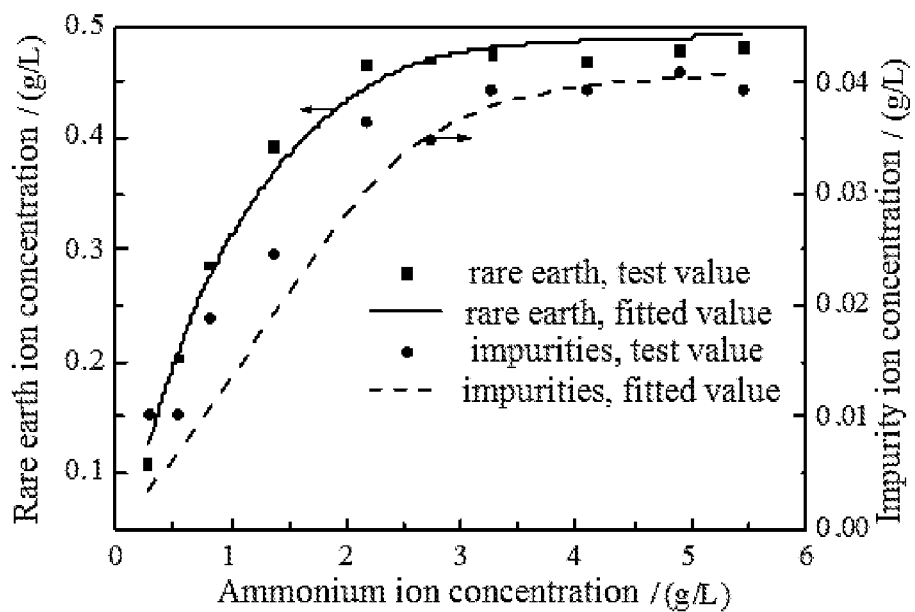
FIG. 4 shows the test values and fitted values of rare earth and impurity ion concentrations.

10 centrifuge cartridges of 100 mL are taken, 10-50 g (20 g for this embodiment) of mineral earths are added, respectively, 80 mL of an ammonium sulfate solution of 1.0-20.0 g/L is added sequentially, stirring is performed with a magnetic stirrer for 2 h, and the concentrations of rare earth ions and impurity ions in the leachate are tested by using an ICP-MS instrument, the results are as shown in FIG. 4, and the process of exchange for ammonium ions and rare earth ions and the process of exchange for ammonium ions and impurity ions are described by using a two-parameter model, as shown in a relational expression (8) and a relational expression (9).

$$\frac{C_{s0}^{RE} - \frac{V_L}{m_s}C_{aq}^{RE}}{C_{aq}^{RE}} = \exp\left(p_1 \ln\left(\frac{\frac{3M_N V_L}{M_{RE}m_s}C_{aq}^{RE} + \frac{2.31M_N V_L}{M_{IM}m_s}C_{aq}^{IM}}{C_{aq0}^N - \frac{3M_N}{M_{RE}}C_{aq}^{RE} - \frac{2.31M_N}{M_{IM}}C_{aq}^{IM}}\right) + p_2\right), \quad (8)$$

$$\frac{C_{s0}^{IM} - \frac{V_L}{m_s}C_{aq}^{IM}}{C_{aq}^{IM}} = \exp\left(p_3 \ln\left(\frac{\frac{3M_N V_L}{M_{RE}m_s}C_{aq}^{RE} + \frac{2.31M_N V_L}{M_{IM}m_s}C_{aq}^{IM}}{C_{aq0}^N - \frac{3M_N}{M_{RE}}C_{aq}^{RE} - \frac{2.31M_N}{M_{IM}}C_{aq}^{IM}}\right) + p_4\right). \quad (9)$$

In the relational expression (8) and the relational expression (9), $V_L$, and $m_s$ are the volume of the added ammonium sulfate solution and the mass of the added mineral earth, respectively, $p_1$, $p_2$, $p_3$ and $p_4$ are model parameters of the two-parameter model, $C_{s0}^{RE}$ and $C_{s0}^{IM}$ are the concentrations of rare earth ions and impurity ions on the ore sample prior to leaching, respectively, $C_{s0}^{RE}=\varepsilon_{RE}M_{RE}/M_{REO}$, $C_{s0}^{IM}=\varepsilon_{IM}M_{IM}/M_{IMO}$, $\varepsilon_{RE}$ and $\varepsilon_{IM}$ are the rare earth grade and the impurity grade, respectively, $M_{RE}$ and $M_{REO}$ are the relative molecular masses of the rare earth ions and the rare earth oxides, respectively, $M_{IM}$ and $M_{IMO}$ are the relative molecular masses of the impurity ions and the corresponding oxides, respectively, MN is the relative molecular mass of the ammonium ions, $CR_{aq}^{RE}$ and $C_{aq}^{IM}$ are the concentrations of the rare earth ions and the impurity ions in the leachate, respectively, and $C_{aq0}^N$ is the concentration of the added ammonium sulfate solution.

The model parameters ($p_1$, $p_2$, $p_3$, $p_4$) of exchange for the rare earth ions and impurity ions with ammonium ions are determined to be (3.82, 24.57, 3.96, 27.23) by fitting the experimental data in FIG. 4 by using the relational expression (8) and the relational expression (9) to yield the fitted value curve in FIG. 4.

A fifth step, the liquid injection process is optimized.

A relational expression (10) is used to describe the percolation process of moisture within the ore body, and a relational expression (11) is used to describe the transport process of the ammonium ions, rare earth ions and impurity ions within the ore body.

$$\frac{\partial \theta}{\partial t} = \frac{\partial}{\partial x}\left(K_x \frac{\partial h}{\partial x}\right) + \frac{\partial}{\partial y}\left(K_y \frac{\partial h}{\partial y}\right) + \frac{\partial}{\partial z}\left(K_z \frac{\partial h}{\partial z}\right) - \frac{\partial K_z}{\partial z}, \quad (10)$$

-continued $$\frac{\partial(\theta C_X)}{\partial t} = \frac{\partial}{\partial x}\left(\theta D_x \frac{\partial C_X}{\partial x}\right) + \frac{\partial}{\partial y}\left(\theta D_y \frac{\partial C_X}{\partial y}\right) + \quad (11)$$
$$\frac{\partial}{\partial z}\left(\theta D_z \frac{\partial C_X}{\partial z}\right) - \frac{\partial(\theta u_x C_X)}{\partial x} - \frac{\partial(\theta u_y C_X)}{\partial y} - \frac{\partial(\theta u_z C_X)}{\partial z}.$$

In the relational expression (10) and the relational expression (11), X=NH for the ammonium ions, X=RE for the rare earth ions, X=IM for the impurity ions, $K_x$, $K_y$ and $K_z$ are the non-saturated permeability coefficients in x, y and z directions, respectively, $u_x$, $u_y$ and $u_z$ are the true pore flow rates in x, y and z directions, respectively, $D_x$, $D_y$ and $D_z$ are the hydrodynamic diffusion coefficients in x, y and z directions, respectively, $D_x=\alpha_x u_x$, $D_y=\alpha_y u_y$, $D_z=\alpha_z u_z$, $\alpha_x$, $\alpha_y$ and $\alpha_z$ are the diffusion degrees in x, y and z directions, respectively, and the mineral earth isotropy problem is assumed, $u_x=u_y=u_z=u_L$, $\alpha_x=\alpha_y=\alpha_z=\alpha$, and $K_x=K_y=K_z=K$.

The leaching process is equivalent to a uniform liquid injection situation, the moisture content is constant to be 0.4500 m³/m³ at the boundary between the ore bed and the topsoil layer, the ammonium sulfate concentration injected first is 20 g/L, then underscreen water is injected, the moisture content distribution within the ore body is calculated by using the relational expression (10), the distribution of the ammonium ions, rare earth ions and impurity ions under the action of convection and diffusion is calculated by using the relational expression (11), finally the distribution of the ammonium ions, rare earth ions and impurity ions within the ore body is modified by the relational expression (8) and the relational expression (9), during which the penetration curve of the rare earth ions can be obtained, leaching is ended when the rare earth ion concentration is less than 0.1 g/L, the rare earth ion distribution within the tailings is calculated, and the rare earth leaching rate is calculated by using a relational expression (12).

$$\eta_{RE} = \frac{\int_0^{L_x}\int_0^{L_y}\int_0^{L_z} C_{s0}^{RE} dxdydz - \int_0^{L_x}\int_0^{L_y}\int_0^{L_z} C_{s,end}^{RE} dxdydz}{\int_0^{L_x}\int_0^{L_y}\int_0^{L_z} C_{s0}^{RE} dxdydz}. \quad (12)$$

In the relational expression (12), $\eta_{RE}$ is the rare earth leaching rate, $L_x$, $L_y$, and $L_z$ are the length, and width of the ore body, and the thickness of the ore bed, respectively, and $C_{s,end}^{RE}$ is the distribution of rare earth ion concentration within the ore body after leaching.

Figure 5:
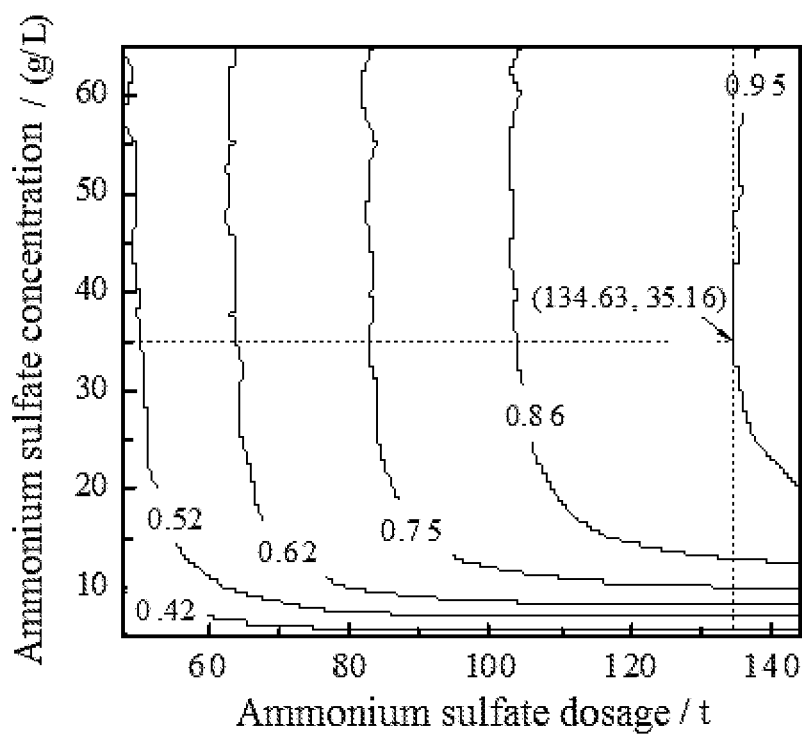
FIG. 5 is a profile plot for determining a liquid injection scheme.

The concentration and total amount of the injected ammonium sulfate solution are changed, the relationship between the rare earth leaching rate and the concentration and dosage of the injected ammonium sulfate solution can be obtained, the results are shown in FIG. 5, the target leaching rate is set to 0.95, a vertical line is drawn in the figure, and moves horizontally to the right, the coordinates of the first intersection of the vertical line with the profile line of the leaching rate of 0.95 are the concentration and dosage of the injected ammonium sulfate, results are 134.63 t and 35.16 g/L, respectively, liquid injection meshes of 1.50 m×1.50 m are formed in the ore body, a liquid collection project is arranged at the mountain foot with a rare earth grade of 0.25‰ as a boundary grade, an ammonium sulfate solution having a concentration of 35.16 g/L is injected into the liquid injection meshes, after 134.63 t of ammonium sulfate is completely injected, then the underscreen water is injected, after the rare earth ion concentration in the mother liquor is less than 0.01 g/L, the leaching is completed, tailings are taken to test the rare earth grade of the tailings in the ore body, and the actual leaching rate of the leaching process is calculated to be 0.93, and thus it can be seen that the method presented in this patent can better determine the liquid injection scheme (the concentration and dosage of the injected ammonium sulfate).

The above are only the preferred embodiments of the present disclosure, and the protection scope of the present disclosure is not limited to the above-mentioned embodiments. All technical solutions under the idea of the present disclosure belong to the protection scope of the present disclosure. It should be noted that for those of ordinary skill in the art, several improvements and modifications without departing from the principle of the present disclosure should also be regarded as the protection scope of the present disclosure.

What is claimed is:

1. A method for optimizing a liquid injection process of ionic rare earth ore, comprising the following steps of:
   step 1: testing the hydraulic properties of an ore body: arranging a plurality of moisture sensors within the ore body, performing an in situ water injection test, analyzing moisture content data by using a hydraulic property inverse analysis method, and determining the hydraulic properties of the ore body;
   step 2: determining the diffusion degree of the ore body;
   step 3: forming prospecting holes in the ore body and sampling to determine the spatial distribution of the rare earth grade and the impurity grade of the ore body prior to leaching;
   step 4: establishing a mathematical model for competitive exchange of rare earth ions and impurity ions with ammonium ions, sampling in situ, performing a leaching-in-tube test, and determining model parameters of the competitive exchange of the rare earth ions and impurity ions with ammonium ions;
   step 5: substituting the hydraulic properties obtained in the step 1 into a mathematical equation of an existing percolation process within the ore body, determining a moisture content distribution within the ore body, substituting the obtained moisture content distribution and the diffusion degree of the ore body obtained in the step 2 into a convection-diffusion equation to obtain distribution of ions within the ore body at any time under the action of convection and diffusion, and modifying the distribution of the ions within the ore body at any time by taking into account the grade distribution of the step 3 and the competitive exchange model of the step 4) to obtain distribution of rare earth ion concentration within the ore body after completion of leaching;
   step 6: determining a rare earth leaching rate of the ore body according to the ion concentration distribution within the ore body before and after leaching, and varying the concentration and the dosage of an injected leaching agent to obtain a profile plot of the rare earth leaching rate as a function of the concentration and the dosage of the injected leaching agent; and
   step 7: setting a target leaching rate, determining a minimum leaching agent dosage to achieve the target leaching rate according to the profile plot obtained in the step 6, and determining the ammonium sulfate concentration according to the minimum leaching agent dosage for the purpose of optimizing the liquid injection process.

2. The method for optimizing the liquid injection process of the ionic rare earth ore according to claim 1, wherein specific steps for determining the dispersion degree of the ore body in the step 2 comprise: establishing a fractal model of a soil-water characteristic curve and a fractal model of a non-reactive ion penetration curve by fractal theory, fitting the soil-water characteristic curve obtained in the step 1 by adopting the fractal model of the soil-water characteristic curve to obtain fractal parameters in the fractal model, substituting the fractal parameters into the fractal model of the penetration curve to obtain the penetration curve, and fitting the penetration curve by adopting an analytical solution to a convection-diffusion model of non-reactive ions to determine the diffusion degree of the ore body.

3. The method for optimizing the liquid injection process of the ionic rare earth ore according to claim 1, wherein the hydraulic properties of the ore body comprise the soil-water characteristic curve and an unsaturated permeability coefficient.

4. The method for optimizing the liquid injection process of the ionic rare earth ore according to claim 1, wherein during the prospecting process in the step 3, it is necessary to test simultaneously the amount of rare earth ions and impurity ions adsorbed on a mineral earth sample, the impurity ions comprise all non-rare earth cations adsorbed on the surfaces of mineral earth particles, and the average valence state of the impurity ions is determined by using a weighted average method.

5. The method for optimizing the liquid injection process of the ionic rare earth ore according to claim 1, wherein the process of exchange of the ammonium ions and rare earth ions and the process of exchange of the ammonium ions and impurity ions in the step 4 are described by using a two-parameter model, and the competitive exchange characteristics of the rare earth ions and impurity ions are taken into account by conservation of adsorption sites on the surfaces of the mineral earth particles in the exchange processes.

6. The method for optimizing the liquid injection process of the ionic rare earth ore according to claim 1, wherein in the step 1, a liquid injection hole having an ore discovery depth of 0.50-1.00 m and a diameter of 0.10-0.20 m is dug first, then at least 3 sensor burying holes penetrating through an ore bed are dug in a same plane with the central axis of the liquid injection hole, and at least 3 moisture sensors are buried in each sensor burying hole.

7. The method for optimizing the liquid injection process of the ionic rare earth ore according to claim 6, wherein the vertical spacing of adjacent moisture sensors is 0.50-1.50 m.

8. The method for optimizing the liquid injection process of the ionic rare earth ore according to claim 1, wherein a van Genuchten-Mualem model is used to describe the hydraulic properties of the ore body in the step 1.

* * * * *